United States Patent [19]

Oliver

[11] Patent Number: 4,906,145

[45] Date of Patent: Mar. 6, 1990

[54] REPLACEABLE CUTTER BLADE

[75] Inventor: Lloyd R. Oliver, Algonac, Mich.

[73] Assignee: L. R. Oliver & Company, Inc., Anchorville, Mich.

[21] Appl. No.: 37,550

[22] Filed: Apr. 13, 1987

[51] Int. Cl.$^4$ .................... B26D 1/12; B29C 37/02
[52] U.S. Cl. ........................................ 407/43; 29/78; 83/955; 407/103
[58] Field of Search ............... 407/43, 33, 46–48, 407/51, 101, 113, 103; 29/78–80; 83/838–841, 926 H; 144/218, 241

[56] References Cited

U.S. PATENT DOCUMENTS

| | | | |
|---|---|---|---|
| 74,437 | 2/1868 | Simonds | 407/103 |
| 2,634,498 | 4/1953 | Abrahamsen | 30/171 |
| 2,783,537 | 3/1957 | Gringer | 30/320 |
| 3,604,084 | 9/1971 | Krieger et al. | 407/113 X |
| 3,670,380 | 6/1972 | Moore et al. | 407/113 X |
| 3,742,565 | 7/1973 | Boboltz et al. | 407/113 X |
| 3,762,005 | 10/1973 | Erkfritz | 407/113 |
| 3,867,792 | 2/1975 | Pelletier | 51/33 W |
| 3,888,145 | 6/1975 | Heaton et al. | 407/48 X |
| 3,919,904 | 11/1975 | Kuts | 82/47 |
| 3,930,529 | 1/1976 | Fawcett et al. | 407/48 X |
| 3,945,289 | 3/1976 | Baez Rios | 83/839 X |
| 3,953,915 | 5/1976 | Fawcett et al. | 407/48 X |
| 4,036,275 | 7/1977 | Branick | 157/13 |
| 4,077,733 | 3/1978 | Immonen | 407/52 |
| 4,209,047 | 6/1980 | Weill | 407/48 X |
| 4,287,648 | 9/1981 | Hineborg et al. | 29/79 |
| 4,291,445 | 9/1981 | Johnson | 407/48 X |
| 4,315,706 | 2/1982 | Erkfritz | 407/101 |

FOREIGN PATENT DOCUMENTS 2057940  4/1981  United Kingdom ................ 407/48

Primary Examiner—Hien H. Phan
Attorney, Agent, or Firm—Harness, Dickey & Pierce

[57] ABSTRACT

An improved machining device is disclosed which is particularly well suited for machining of a wide variety of materials and in particular elastomeric materials such as for example synthetic rubber employed in manufacture of motor vehicle tires. The machining device comprises a rotatable wheel having secured around the periphery in spaced relationship a plurality of replaceable cutting inserts each of which incorporates piercing corner portions having an acute included angle followed by a sharp linear edge portion operable to produce a clean severing action which results in a finely textured machined surface. Each of the inserts also incorporates a securing arrangement which allows the cutter inserts to be quickly and easily secured to the wheel and also accurately locates the cutting edges thereof along a common circle concentric with the axis of rotation of the wheel. Various arrangements are also disclosed for preventing rotational movement of the cutter insert during use thereof.

14 Claims, 3 Drawing Sheets

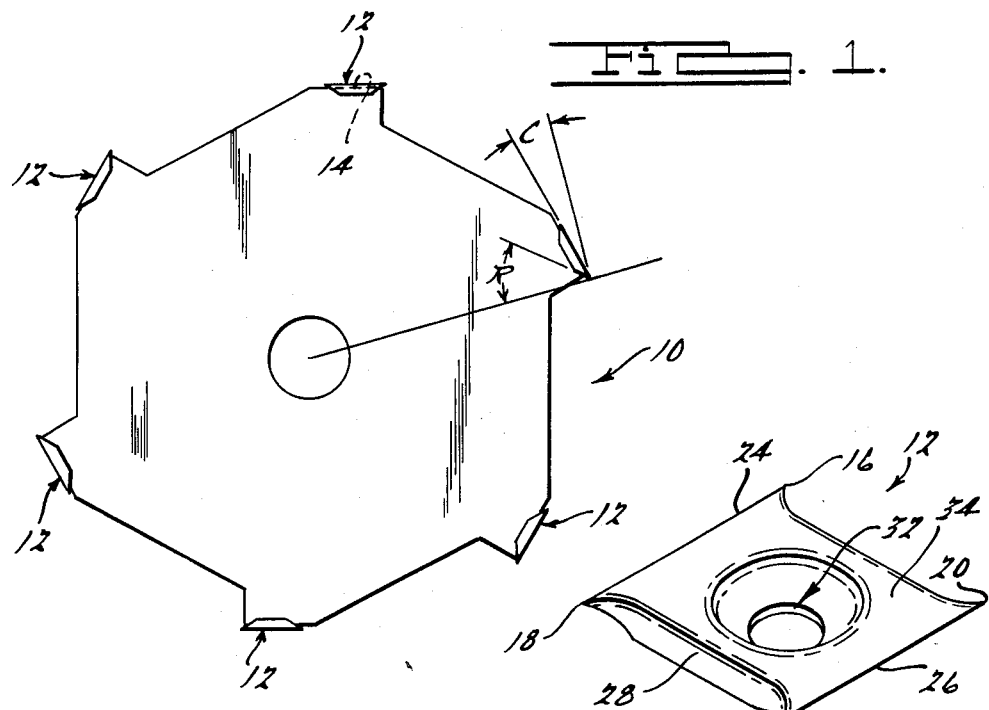
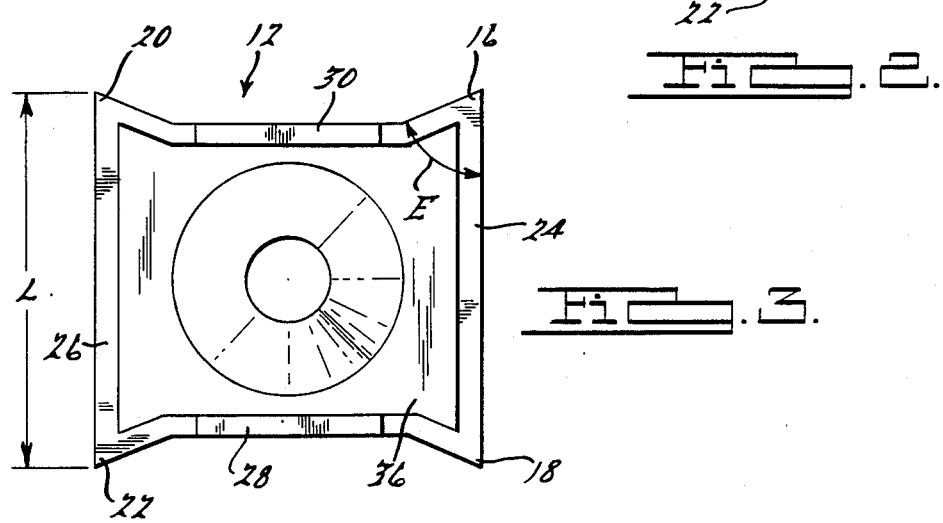
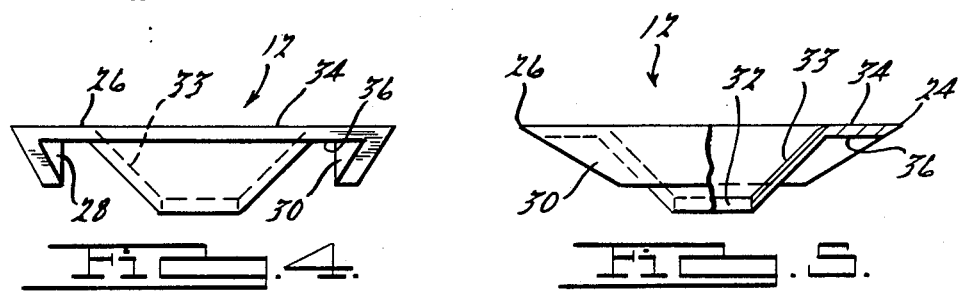
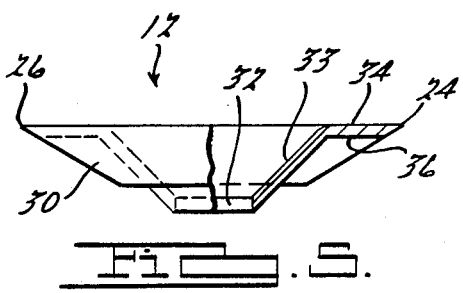

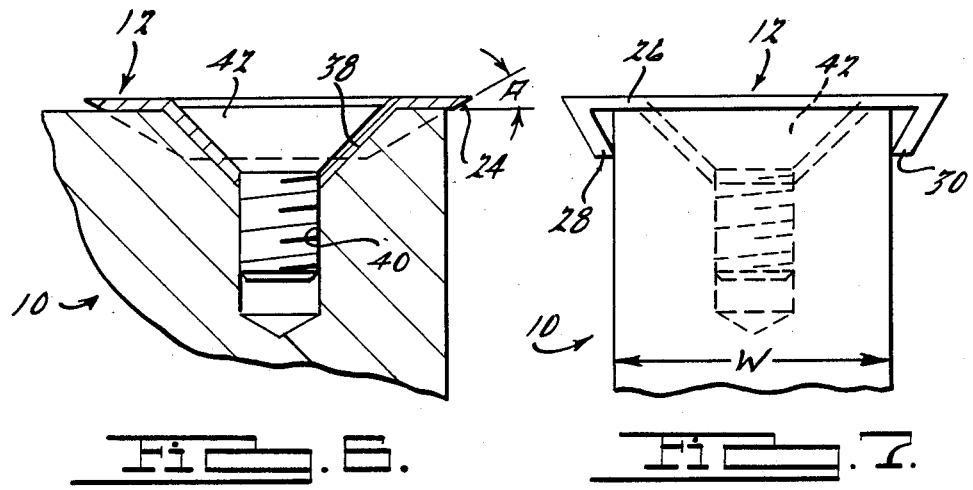
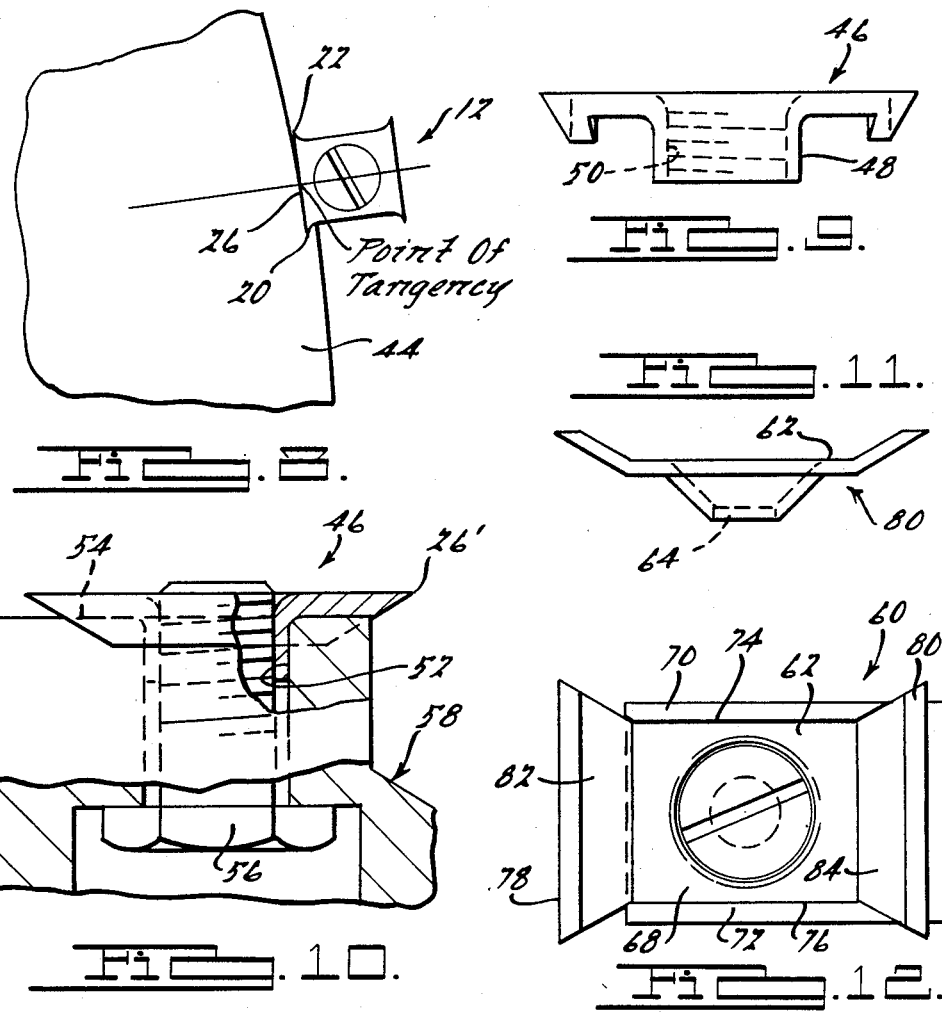

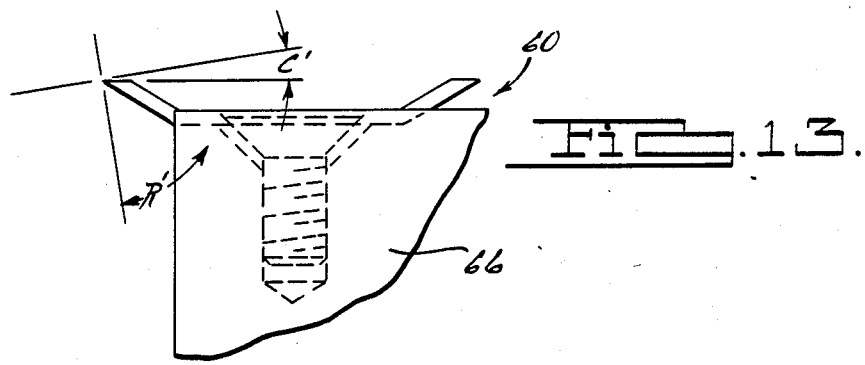
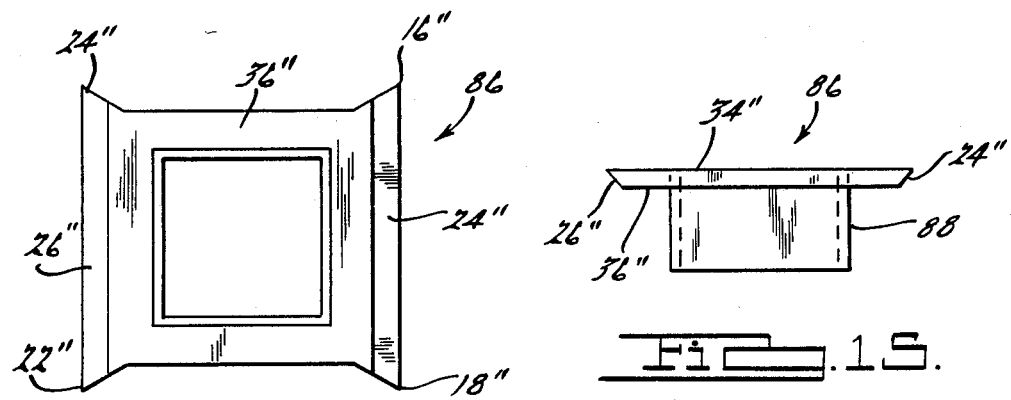
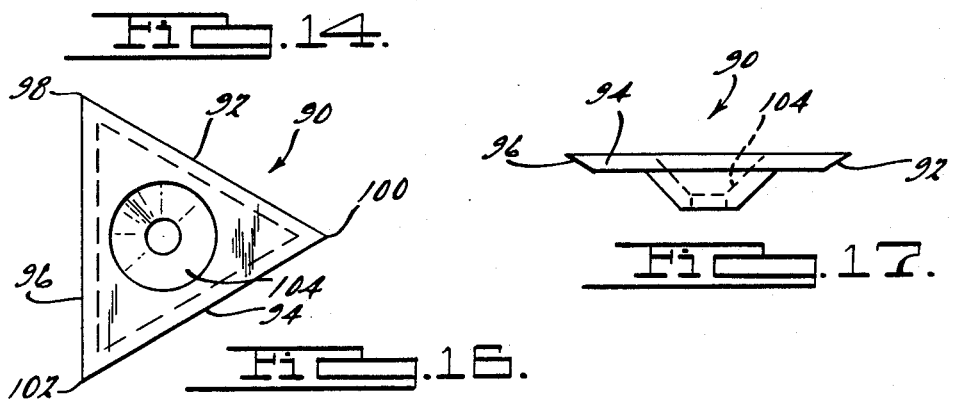
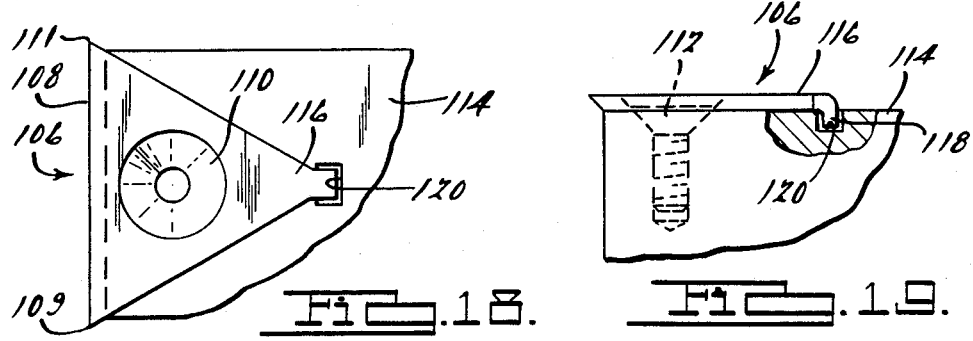

REPLACEABLE CUTTER BLADE

BACKGROUND AND SUMMARY OF THE INVENTION

The present invention relates generally to machining apparatus and more specifically to an improved cutting wheel well suited for use in machining of a wide variety of materials and in particular various types of elastomeric materials such as synthetic rubber and the like.

Machining of different types of materials presents widely varying and often conflicting problems. One tool design may be exceedingly effective for machining and/or shaping of one type of material and yet totally ineffective on another type of material. Various factors contribute to need for often widely varying approaches to machining of different materials such as hardness, ductility, resiliency, etc.

Elastomeric materials such as for example tire treads have been particularly difficult to machine presumably due at least in part to the inherent resiliency of the material. Typically tire tread machining has been accomplished by various types of abrading devices such as rasps, grinding wheels, and wire brushes. Because such devices rely upon a friction type "wearing" action (as opposed to a cutting action) in order to remove material, substantial amounts of relatively fine dust-like particles are generated which are difficult to contain. Further, because the process is dependent upon friction for effectiveness, it is difficult to perform at an economical speed of production without the resulting heat becoming excessive to the point of scorching of the underlying surface. Further, the use of rasp blades and the like also tends to produce many cuts or tears in the underlying surface material which close up as the rasp moves on to other areas. These cuts or tears are particularly undesirable in the case of retreading motor vehicle tires as they may result in a weakening of the tire casing which may not be totally overcome by the subsequent new tread bonding process.

The present invention, however, overcomes the aforementioned problems in providing an improved machining device incorporating replaceable cutter inserts which are specifically designed to effectively and efficiently machine elastomeric materials as well as a wide variety of other materials. The cutter inserts incorporate a unique design which renders them particularly well suited for machining elastomeric materials including preparation of tire casings for retreading. The cutter inserts each include a sharpened corner edge having an acute included angle which operates to effectively pierce the elastomeric material as the carrier wheel is moved axially across the workpiece to be machined. A linear edge portion extending between the corner edges operates to complete the machining action by severing chips of material from the workpiece. Because the insert is designed and mounted with appropriate rake and clearance angles, the stock removal is accomplished by a true machining operation rather than by an abrading action. This machining action for stock removal is also accomplished without the generation of high temperatures thus avoiding the possibility of scorching the underlying surface of the workpiece. Further, because the stock removed is in chip form as opposed to the dust-type particles removed by abrading operations, the need for dust collection equipment is substantially reduced.

The insert also incorporates integrally formed means for accurately positioning the cutting edges when the insert is secured to the carrier wheel thus greatly facilitating replacement thereof. Further, rotation inhibiting means may also be integrally formed on the insert to thus assure the cutting edges are retained in the proper orientation with respect to the workpiece. Additionally, because the cutter inserts do not rely upon high heat generating friction for stock removal as in abrading devices, the cutting edges remain relatively cool thus insuring a relatively long operational life.

Additional advantages and features of the present invention will become apparent from the subsequent description and the appended claims taken in conjunction with the accompanying drawings.

BRIEF DESCRIPTION OF THE DRAWINGS

FIG. 1 is an elevational view of carrier wheel having a plurality of cutter inserts secured in spaced relationship to the periphery thereof, all in accordance with the present invention;

FIG. 2 is an enlarged perspective view of a preferred embodiment of the cutter insert illustrated in FIG. 1;

FIG. 3 is a plan view of the underside of the cutter insert of FIGS. 1 and 2;

FIGS. 4 and 5 are end and side elevational views respectively of the cutter insert of FIG. 1;

FIGS. 6 and 7 are fragmentary edge views showing the cutter insert secured to the carrier wheel, FIG. 6 being in section;

FIG. 8 is a fragmentary plan view showing a single cutter acting on a workpiece in accordance with the present invention;

FIG. 9 is a view similar to that of FIG. 4 but showing an alternative embodiment of the cutter insert in accordance with the present invention;

FIG. 10 is a view similar to that of FIG. 6 but showing the insert of FIG. 9 in a mounted position;

FIG. 11 is a side elevational view of yet another embodiment of a cutter insert in accordance with the present invention;

FIG. 12 is a plan view of the cutter insert of FIG. 11;

FIG. 13 is a side elevational view of the embodiment of FIG. 11 secured to a carrier wheel;

FIGS. 14 and 15 are plan side elevational views respectively of yet another embodiment of the present invention similar to that of FIGS. 1 through 5 but incorporating integrally formed rotation inhibiting means;

FIGS. 16 and 17 are plan and side elevational views respectively of yet another embodiment of the present invention incorporating three machining edges; and FIGS. 18 and 19 are plan and side elevational views of yet another embodiment of the present invention but incorporating integrally formed rotation inhibiting means.

DESCRIPTION OF THE PREFERRED EMBODIMENTS

Referring now to the drawings and in particular to FIGS. 1 through 5, there is shown a carrier wheel 10 having a plurality of cutter inserts 12 secured to suitable formed seats 14 positioned in spaced relationship around the periphery of carrier 10. Carrier 10 is designed to be secured to a rotatable drive shaft and driven in rotation thereby and accordingly the outwardly projecting edges of cutter inserts 12 are all positioned along a circle having a center coaxial with the axis of rotation.

As best seen with reference to FIGS. 1-5, cutter insert 12 is generally rectangular in shape and includes laterally outwardly projecting sharpened corner edge portions 16, 18, 20, 22. Elongated relatively straight sharpened edge portions 24, 26 extend between corner edges 16, 18 and between corner edges 20, 22 respectively. A pair of depending flange portions 28 and 30 extend along the opposite lateral sides and are positioned slightly inwardly from the respective corner edges 16, 18, 20 22. Preferably, cutter insert 12 will be manufactured from a suitable sheet steel material.

A countersunk center opening 32 is provided in cutter insert 12 being defined in part by frusto conical sidewall 33 tapering inwardly from the upper generally planar surface 34 and protruding outwardly from the lower generally planar surface 36. A plurality of generally complementary shaped countersunk openings 38 will also be provided on carrier wheel 10 and have a threaded opening 40 extending inwardly from the inner end. Thus, countersunk opening 32 serves to accommodate a suitable fastener 42 such as for example a threaded screw for securing the cutter insert to carrier wheel 10. Additionally, countersunk opening 32 will preferably be accurately positioned with respect to sharpened edges 24 and 26 so as to insure the respective edges will in fact be accurately positioned along a common circle having a center coaxial with the axis of rotation of carrier wheel 10. By thus accurately positioning the respective cutter inserts, the need to dress the wheel after each replacement of cutter inserts is eliminated.

Preferably, fastener 42 will have a flat upper surface positioned substantially coplanar with upper surface 34 of cutter insert so as to avoid any possibility of interference with the machining action during use although it should be noted that other types of securing arrangements may also be employed. However, the use of a countersunk opening is desirable as the surface area of engagement between the fastener and the cutter insert is substantially increased thus distributing the forces exerted on the cutter insert over a greater area.

As best seen with reference to FIG. 7, the spacing between respective depending flange portions 28 and 30 will preferably be substantially equal to the axial width W of carrier 10 and thus flanges 28 and 30 will overlie the opposite axially facing surfaces thereof creating a saddle arrangement which effectively prevents relative rotation of the cutter insert 12 with respect to carrier 10. It is thus important that flange portions 28 and 30 be substantially parallel to each other and substantially perpendicular to both upper surface 34 and edges 24 and 26 of cutter insert 12.

Preferably, edges 24 and 26 will be substantially identical with an overall length of no more than 2 inches and preferably approximately 1 inch when cutter insert 12 is intended for use in preparation of motor vehicle tires for retreading. Also, for such applications edges 24 and 26 will preferably be ground to provide an acute included edge angle A of approximately 30 degrees or less. Additionally, in such applications seating surfaces 14 on carrier 10 will preferably be designed so as to afford edges 24 and 26 of cutter insert 12 with a clearance angle C of about 15 degrees and a positive rake angle R of about 45 degrees. The piercing corner edge will also have an acute included angle E of about 30 degrees.

As previously mentioned above, the present invention is particularly well suited for use in machining of various elastomeric materials and in particular for use in removal of worn tread from tire casing preparatory to bonding of new tread material thereto. Such materials are exceedingly difficult to machine due in part at least to the resilient nature thereof which enable the material to yield rather than be cut or ruptured when subjected to abrading or other conventional type cutting edges. However, the edge design forming a part of the present invention has been specifically designed to overcome these problems.

By way of illustration of the operation of the cutting insert of the present invention, a segment of a conventional worn motor vehicle tire 44 is shown in FIG. 8. The tire segment shown is a section taken along a radial plane extending along the axis of rotation and hence the curvature represents the inherent crowned contour of the tire. The cutter insert 12 shown represents a single one of such cutters and is shown as it acts upon the tire. In an actual operation, the carrier wheel 10 will carry a plurality of such inserts 12 and will be rotated at a relatively high speed. As the carrier wheel is rotated, the driving apparatus will advance the carrier wheel along an arcuate path following the curvature of the tire. Preferably, in order to obtain the advantages of the cutter insert of the present invention, the midpoint of the cutting edge 24 or 26 will be positioned at the point of tangency with the machined tire casing. Thus, the leading sharpened corner edge 20 will operate to pierce the worn tread portion performing an initial machining operation to accomplish the major portion of the stock removal operation. The portion of edge 28 extending from the midpoint of the cutter insert to the leading edge will continue the machining operation initiated by the leading corner portion removing progressively smaller portions of material with the leading segment of the edge 28 most proximate the midpoint performing a final texturing type machining of the surface thereby leaving the finished surface in an ideal condition for bonding of the new tread material thereto. Because it is the midpoint of the cutter which is tangent to the crowned machined surface of the tire casing, there will be a clearance between the tire casing and the trailing portion of the edge 26 and the trailing sharpened corner portion 22. Thus, these trailing segments will not be subject to wear. However, as the carrier wheel 10 is advanced in the opposite direction during the next pass across the tire, these initially trailing segments will be leading and hence performing the desired machining action. It should also be noted that is is preferred to maintain the overall width of cutter insert 12 to no more than 2 inches and more preferably approximately 1 inch in order to insure the major stock removal action is accomplished by the leading sharpened corner portion in cooperation with the immediately adjacent portion of edge 28. Once the cutting edges of the cutter insert have become worn, the fastener may be loosened and the insert rotated 180 degrees thereby presenting a second set of cutting edges.

A cutter insert 46 incorporating an alternative mounting arrangement is illustrated and will be described with reference to FIGS. 9 and 10. Cutter insert 46 is substantially identical to cutter insert 12 described above except in place of opening 32 having frusto conically shaped sidewalls, a depending generally cylindrically shaped flange portion 48 is provided having a threaded bore 50 extending therethrough. Cylindrical flange portion 48 is intended to be received within a suitable sized opening 52 provided in a mounting seat 54 on a carrier wheel 58 with bore 52 receiving a threaded fastener 56 extending upwardly so as to thereby secure cutter insert 46 to the carrier wheel 58. The cylindrical flange portion 48 will also operate to accurately locate the edge portions 26' in a like manner as described above.

Another embodiment of the present invention is illustrated and will be described with reference to FIGS. 11-13. Cutter insert 60 is somewhat similar to cutter insert 12 having a generally flat central main body portion 62 provided with a centered countersunk opening 64 therein for mounting to a suitable carrier wheel 66. However, cutter insert does not include depending flange portions 28 and 30 but rather is designed to nest in a circumferentially extending channel 68 machined in the mounting seat of carrier wheel 66. The channel is defined by circumferentially extending relatively straight substantially parallel axially spaced sidewalls 70 and 72 which cooperate with respective edge portions 74, 76 of cutter insert 60 to prevent relative rotation between the insert and the carrier wheel. Also, the cutting edge portions 78, 80 of cutter insert 60 are provided on a pair of oppositely extending flange portions 82, 84 which are angled outwardly away from the carrier wheel 66. Preferably, the mounting seat provided on the carrier wheel will preferably be positioned so as to orient the cutting edge 78 in such a manner as to provide the same clearance angle C' and rake angle R' as described above with reference to FIG. 1.

Yet another embodiment is illustrated in FIGS. 14 and 15. Cutter insert 86 is substantially identical to cutter insert 12 described above and accordingly like portions thereof are indicated by like reference numbers double primed. However, in place of the cylindrical depending flange portion illustrated in FIGS. 9 and 10, a rectangular or preferably square shape is imparted thereto which is designed to be received in a suitable complementary shaped mounting hole provided in the carrier. This square shaped flange portion 88 will thus function to prevent relative rotation of the cutter insert hence eliminating the need of saddle flanges provided on cutter insert 12 of FIGS. 1-5. It should be noted that the outer periphery of flange portion 88 may be of any non-circular shape desired but will preferably be symmetrical so as to allow reversal of the insert for enabling use of the cutting edge provided on the opposite side thereof.

A further embodiment of the present invention is illustrated and will be described with reference to FIGS. 16 and 17. In this embodiment cutter insert 90 is generally triangular in shape thus offering three relatively straight machining edges 92, 94, 96 along with three piercing corner edges 98, 100, 102. A countersunk center opening 104 similar to that provided on cutter insert 12 described above is also provided for securing cutter insert 90 to suitable carrier wheel. Preferably, a suitably contoured recess will be provided on the carrier wheel which will cooperate with two of the three edges 92, 94, 96 to prevent relative rotation. This embodiment is particularly useful in application wherein all machining passes over the workpiece occur in the same direction as each cutting edge has associated therewith a corresponding sharpened piercing corner edge. However, it should be noted that this cutter insert could also be used in multi-direction machining pass applications. Preferably, cutter insert 90 will be mounted to a carrier wheel in an orientation to provide similar rake and clearance angles as described above with reference to cutter insert 12.

Referring now to FIGS. 18 and 19, yet another embodiment of the present invention is illustrated. Cutter insert 106 is also of a generally triangular shape similar to that of cutter insert 90 described above, however, only a single sharpened edge 108 is provided thereon along with sharpened corner edges 109, 111 at opposite ends thereof. Also, as described above, a countersunk central opening 110 is provided which is designed to accommodate a suitable threaded fastener 112 for securing the insert to a suitable carrier wheel 114. However, in this embodiment, the rearward corner portion 116 of the triangle is provided with a depending flange portion 118 which is received within a suitably shaped recess 120 provided in the mounting seat of the carrier wheel 114. This flange 118 and recess 120 will cooperate to maintain the cutter insert 106 in the proper orientation during machining operations.

It should be noted that while several arrangements have been described for preventing relative rotation of the cutter inserts with respect to the carrier wheel, other arrangements may be substituted therefor. Also, while the cutter inserts of the present invention have been described for use in machining of elastomeric materials such as motor vehicle tires, it is anticipated that is may be equally useful in machining of a wide variety of other materials.

While it will be apparent that the preferred embodiments of the invention disclosed are well calculated to provide the advantages and features above state, it will be appreciated that the invention is susceptible to modification, variation and change without departing from the proper scope or fair meaning of the subjoined claims.

I claim:

1. A replaceable cutter insert for securing to the periphery of a carrier wheel, said cutter comprising:
    a central main body portion having a central opening adapted to receive fastening means for removably securing said insert to said carrier wheel;
    a depending flange portion integrally formed in said main body portion of said cutter insert for accurately locating said cutter insert when said cutter insert is secured to said carrier wheel, said depending flange portion being spaced from the peripheral edge of said main body portion and having a thickness substantially equal to the thickness of said main body portion;
    elongated edge means provided at one end of said cutter insert;
    piercing corner edge means provided at opposite ends of said elongated edge means, said piercing corner edge means being operative to initially pierce a workpiece being machined by said cutter insert;
    a pair of substantially parallel integrally formed elongated spaced depending flange portions extending along opposite lateral edges of said main body portion, said flanges being adapted to overlie axially opposite sidewalls of said carrier wheel so as to inhibit relative rotational movement of said cutter insert with respect to said carrier wheel.

2. A replaceable cutter insert for securing to the periphery of a carrier wheel, said cutter comprising:
    a central main body portion having a central opening adapted to receive fastening means for removably securing said insert to said carrier wheel;
    a cylindrically shaped depending flange portion integrally formed in said main body portion of said cutter insert for accurately locating said cutter insert when said cutter insert is secured to said carrier wheel, said depending flange portion being internally threaded and spaced from the peripheral edge of said main body portion and having a thickness substantially equal to the thickness of said main body portion;

elongated edge means provided at one end of said cutter insert; and piercing corner edge means provided at opposite ends of said elongated edge means, said piercing corner edge means being operative to initially pierce a workpiece being machined by said cutter insert.

3. A replaceable cutter insert for securing to the periphery of a carrier wheel, said cutter comprising:

a central main body portion having a central opening adapted to receive fastening means for removably securing said insert to said carrier wheel;

a depending flange portion integrally formed in said main body portion of said cutter insert for accurately locating said cutter insert when said cutter insert is secured to said carrier wheel, said depending locating flange being frusto conical in cross-sectional shape and being spaced from the peripheral edge of said main body portion and having a thickness substantially equal to the thickness of said main body portion;

elongated edge means provided at one end of said cutter insert; and piercing corner edge means provided at opposite ends of said elongated edge means, said piercing corner edge means being operative to initially pierce a workpiece being machined by said cutter insert.

4. A replaceable cutter insert as set forth in claim 3 wherein said cutter insert includes integrally formed means adapted to cooperate with said carrier wheel to inhibit relative rotational movement of said insert with respect thereto.

5. A replaceable cutter insert as set forth in claim 4 wherein said rotation inhibiting means comprise a second depending flange portion.

6. A replaceable cutter insert as set forth in claim 3 wherein said cutter insert includes integrally formed means adapted to cooperate with said carrier wheel to inhibit relative rotational movement of said insert with respect thereto.

7. A replaceable cutter insert as set forth in claim 6 wherein said rotation inhibiting means comprise a pair of substantially parallel elongated spaced depending flange portions extending along opposite lateral edges of said main body portion, said flanges being adapted to overlie axially opposite sidewalls of said carrier wheel.

8. A replaceable cutter insert as set forth in claim 7 wherein said piercing corner edge means has an acute included angle.

9. A replaceable cutter insert as set forth in claim 8 wherein said corner edge means project laterally outwardly beyond said spaced depending flange portions.

10. A replaceable cutter insert as set forth in claim 8 wherein said elongated edge means has a length less than 2 inches.

11. A replaceable cutter insert as set forth in claim 8 wherein said spaced depending flange portions include end portions buttressing said corner edge means.

12. A cutting wheel for use in machining elastomeric materials comprising:

a carrier wheel;

a plurality of mounting seats positioned in spaced relationship around the periphery of said wheel, each of said mounting seats including a generally planar surface having a fastener receiving opening therein;

a plurality of removable cutter inserts, one of said cutter inserts being positioned on each of said mounting seats, each of said cutter inserts including a main body portion, an elongated cutting edge extending generally parallel to the axis of rotation of said wheel and piercing corner edge means positioned at opposite ends of said elongated cutting edge, said corner edge means having an acute included angle, each of said cutter inserts further including integrally formed depending flange means spaced from the periphery of said cutter insert and cooperating with said opening to accurately locate said cutter inserts on said seats whereby said elongated cutting edges are positioned substantially along the periphery of a circle having a center coaxial with the axis of rotation of said carrier wheel, said depending flange means and said main body portion are of substantially the same material thickness, means spaced from said depending flange means for preventing relative rotation of said cutter insert with respect to said carrier wheel; and fastener means for securing said cutter inserts to said mounting seats.

13. A cutting wheel as set forth in claim 12 wherein said cutter insert is fabricated from sheet metal.

14. A cutting wheel as set forth in claim 12 wherein said mounting seats are positioned so as to provide a rake angle of approximately 45 degrees for said cutter inserts and a clearance angle of approximately 15 degrees.

* * * * *